United States Patent
Kasiraj et al.

(10) Patent No.: US 7,014,530 B2
(45) Date of Patent: Mar. 21, 2006

(54) SLIDER FABRICATION SYSTEM FOR SLIDERS WITH INTEGRATED ELECTRICAL LAPPING GUIDES

(75) Inventors: Prakash Kasiraj, San Jose, CA (US); Quang Le, San Jose, CA (US); Huey Tzeng, San Jose, CA (US); Xiao Z. Wu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 204 days.

(21) Appl. No.: 10/675,043

(22) Filed: Sep. 29, 2003

(65) Prior Publication Data

US 2005/0070206 A1   Mar. 31, 2005

(51) Int. Cl.
 *B24B 49/00* (2006.01)
(52) U.S. Cl. ............................................ 451/8; 451/41
(58) Field of Classification Search ................... 451/5, 451/8, 11, 41
See application file for complete search history.

(56) References Cited

U.S. PATENT DOCUMENTS

| | | | |
|---|---|---|---|
| 5,778,514 A | 7/1998 | Das | |
| 5,885,131 A | 3/1999 | Azarian et al. | |
| 6,027,397 A | 2/2000 | Church et al. | |
| 6,193,584 B1 * | 2/2001 | Rudy et al. | 451/5 |
| 6,347,983 B1 * | 2/2002 | Hao et al. | 451/57 |
| 6,399,148 B1 | 6/2002 | Fukuroi et al. | |
| 6,513,228 B1 * | 2/2003 | Khizroev et al. | 29/603.14 |
| 6,623,330 B1 * | 9/2003 | Fukuroi | 451/5 |
| 6,684,171 B1 * | 1/2004 | Church et al. | 702/104 |
| 6,728,067 B1 * | 4/2004 | Crawforth et al. | 360/234.3 |
| 2002/0012204 A1 | 1/2002 | Boutaghou et al. | |
| 2002/0106974 A1 | 8/2002 | Fukuroi | |
| 2003/0021069 A1 | 1/2003 | Crawforth et al. | |
| 2003/0200041 A1 * | 10/2003 | Church et al. | 702/104 |
| 2004/0075940 A1 * | 4/2004 | Bajorek et al. | 360/110 |

* cited by examiner

*Primary Examiner*—M. Rachuba
(74) *Attorney, Agent, or Firm*—G. Marlin Knight

(57) ABSTRACT

A slider is described with a resistive electro-lapping guide (ELG), which is aligned with a structure in the write head such as the throat height or trailing shield thickness and extends from the lapping region through the ABS and is connected to pads on the surface of the slider. In a second embodiment the ELG is disposed entirely in the section of the slider which will be removed by lapping. Another embodiment of the invention is a system for single slider lapping which simultaneously monitors the resistance of the read sensor or a read head ELG and at least one ELG that is aligned with a structure in the write head. A controller uses the resistance information to implement an algorithm which decides when lapping should be terminated.

6 Claims, 3 Drawing Sheets

SLIDER FABRICATION SYSTEM FOR SLIDERS WITH INTEGRATED ELECTRICAL LAPPING GUIDES

FIELD OF THE INVENTION

The invention relates to fabrication systems and aids for manufacturing thin film magnetic recording heads and more particularly to methods and aids for lapping the air-bearing surface (ABS) portion of the slider to achieve precise control over selected parameters.

BACKGROUND OF THE INVENTION

In a typical prior art magnetic disk recording system a slider containing magnetic transducers for reading and writing magnetic transitions is supported by a suspension as it flies above a disk that is being rotated by a spindle motor. The disk includes a plurality of thin films and at least one ferromagnetic thin film in which the recording (write) head records the magnetic transitions in which information is encoded. The magnetic domains in the media on can be written longitudinally or perpendicularly. The read and write head portions of the slider are built-up in layers using thin film processing techniques. Typically the read head is formed first, but the write head can also be fabricated first. The conventional write head is inductive and the read sensor is magnetoresistive. In the typical process of fabricating thin film magnetic transducers, a large number of transducers are formed simultaneously on a wafer. After the basic structures are formed the wafer may be sawed into quadrants, rows or individual transducers. Further processing may occur at any or all of these stages. Although sawing has been the typical method for separating the wafers into individual sliders, recently reactive ion etching (RIE) or deep reactive ion etching (DRIE) with a fluorine containing plasma has been used. The surfaces of the sliders perpendicular to the surface of the wafer that are exposed when the wafers are cut eventually form the air bearing surface (ABS) of the slider.

FIG. 1 is a simplified illustration of a midline section of one type of prior art slider 20 containing magnetic transducers for longitudinal recording. The slider 20 is shown prior to being sawed from the wafer. The components of the read head 22 include the read sensor 35. The write (recording) head 23 includes a coil 33, a pole piece (P1) 45 and a gap layer that forms the write gap at what will become the air-bearing surface (ABS). The zero throat height (ZTH) is defined as the point where the pole piece (P3) 38 first touches the gap layer. The pole pieces are ferromagnetic materials, e.g., NiFe or CoFe. Prior to lapping, the structures that will be at the ABS extend beyond the ABS. As illustrated in FIG. 1 the material to the right of the ABS plane is removed by lapping to achieve precise control of the length of the sensor 35 (which is called the "stripe height") and the distance from the ZTH to the ABS which is called the "throat height." The uncertainty of the saw plane would cause unacceptable variations in the stripe height which would lead to unacceptable variations in magnetic performance if not corrected. Lapping is the process used in the prior art to achieve stripe height control in the nanometer range.

After lapping, features typically called "rails" (not shown) are formed on the ABS of magnetic transducer 20. The rails have traditionally been used to determine the aerodynamics of the slider and serve as the contact area should the transducer come in contact with the media either while rotating or when stationary.

Sliders have conventionally been lapped in rows, but it can be advantageous to have the individual sliders cut out prior to lapping. Even though the sliders have been separated, it is possible to lap several at one time by attaching them to carrier.

Current lapping methods are targeted to achieve tight control of the stripe-height. The endpoint of the lapping process is either determined by one or more electro-lapping guides (ELG), which are aligned with the read sensor, or by the sensor resistance itself. Once the ELG value or the read sensor resistance value reach preset target values, the lapping is stopped.

With perpendicular recording heads, critical elements defined by lapping now exist both in the read and write head. Unlike longitudinal head design where the stripe height is the major critical element, perpendicular head design, on the other hand, has several critical structures in both the read and write heads. The current lapping techniques are ineffective for simultaneously defining both read and write elements with tight lapping tolerance.

Much of the prior art on lapping guides is directed toward row lapping. In U.S. Pat. No. 6,027,397 to Church, et al. a row lapping method using two ELGs for simultaneously monitoring the lapping of read write elements is described. The ELG structures and their electrical connections are positioned in the saw kerf regions and not integrated into the slider fabrication process. As critical elements of magnetic heads are scaled downwards tighter dimension control is required. Row lapping is insufficient to achieve the needed lapping tolerances. This can be due to the shape of the slider not being flat. Church, et al., also describe the use of a switch to signify endpoint for throat height lapping control. The switch is closed until lapping reaches the critical point where the switch is opened. This approach can be used with single slider lapping but with a few drawbacks. A subtractive method such as ion milling is the preferred method to fabricate the write pole. If the switch is fabricated simultaneously with the write pole both structures are exposed during ion milling, the physical etching process can cause the structures to shift and distort their alignment. Shadowing effects can also cause problems.

SUMMARY OF THE INVENTION

One embodiment of the invention is a slider with an integrated, resistive electro-lapping guide (ELG), which is self-aligned with a selected structure of the write head and extends from the lapping region through the ABS. As lapping progresses the resistance of the ELG goes up providing a way to judge whether the structures of the write head have achieved their target dimensions. Preferably the ELG is electrically connected to additional electric contact pads or to one or more of the four contact pads that are used in prior art designs to make connection to the coil in the write head (W−, W+) and to read sensor (R−, R+). The ELG in this embodiment is preferably located either in the write gap or the separation gap between the nearest read head shield and a pole piece of the write head. A second embodiment of the ELG is disposed entirely in the section which will be removed by lapping. This ELG is used during the initial lapping phase, but ends before the ABS is reached. The end of the ELG is placed close to the targeted ABS. After the ELG is removed the lapping process continues using other measurements to determine the endpoint.

Another embodiment of the invention is a system for single slider lapping which simultaneously monitors an ELG associated with the read sensor dimension or the resistance of the read sensor as a measure of the current stripe height of the read sensor and at least one ELG that is self-aligned with one or more key features of the write head such as the throat height or trailing shield thickness. Preferably one or more sliders are bonded or clamped to a carrier that is inserted into the lapping hardware. The connections are made using electrical pads on the slider. The measurement units measure the resistance of the ELG and the resistance of the read sensor itself or a read sensor ELG during lapping. A controller uses the resistance information to implement an algorithm which decides when lapping should be terminated, that is, when the target ABS has been reached. Optionally means to modulate the lapping pressure on each slider can be included if multiple sliders are being lapped on one carrier.

DETAILED DESCRIPTION OF THE INVENTION AND THE PREFERRED EMBODIMENTS

The electro-lapping-guides (ELGs) of the invention can be employed in any thin film device or microelectronics where critical elements are defined by lapping. The ELGs will be described in the context of their employment in sliders for magnetic recording. The ELGs can be used in sliders with write heads for longitudinal or perpendicular recording, as well as, in sliders with side-by-side heads. Heads incorporating one or more ELGs according to the invention can have the read head fabricated first or second.

The ELGs will further be described in connection with critical elements in the write head structure. The ELGs will be self-aligned to a selected critical element in the write head by integrating the fabrication process for the ELG into the process of manufacturing the write head. The ELGs will be used in a single slider lapping process. The ELGs are fabricated to be self-aligned to the selected critical write head structures such as the throat height, pedestal height, shield height (thickness) or flare point. One method of fabricating the ELG of the invention is to define and self-align the ELG to a selected critical structure during the seed-layer removal process of the critical element. For example, the material for the ELG can be deposited under the seed layer for P2 which becomes the main pole piece, then the same process used to remove the excess seed layer after P2 is formed can be used to form the ELG by trimming away the ELG material outside of the bounds of P2. In this process the critical feature acts as the mask for creating the ELG insuring alignment. The initial dimensions of the ELG will be lithographically defined.

Figure 1:
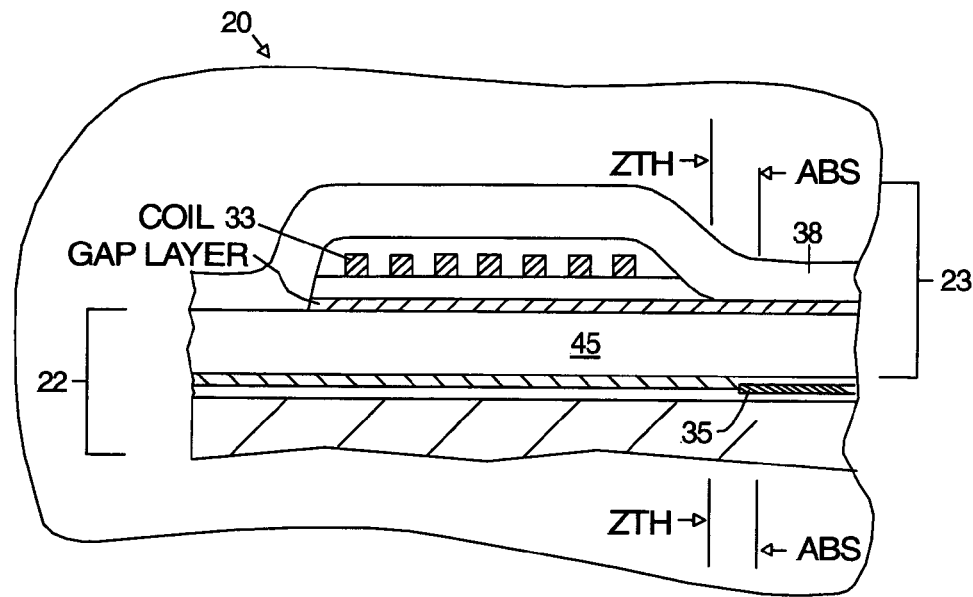
FIG. 1 is a symbolic illustration of a section of a prior art recording head taken perpendicular to the air-bearing surface.
Figure 2:
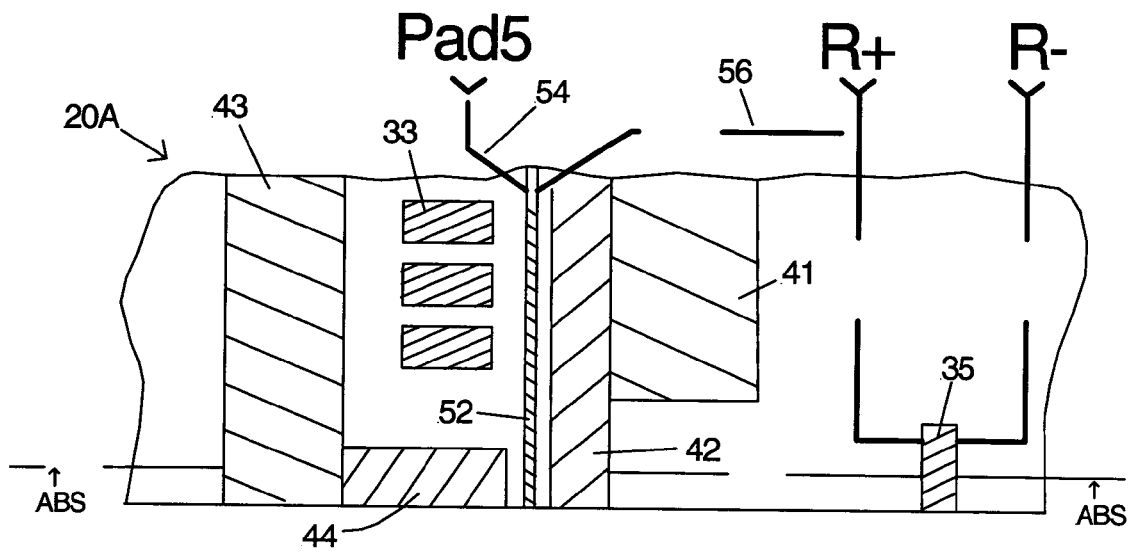
FIG. 2 is a symbolic illustration of a section of a recording head with an integrated ELG according to a first embodiment of the invention. The section taken is perpendicular to the air-bearing surface.

FIG. 2 illustrates a section of a slider 20A according to a first embodiment of the invention with an ELG that extends through the ABS. The section is taken perpendicular to the ABS. The write head portion is designed for perpendicular recording and includes a trailing shield 44. The trailing shield 44 extends from the ABS end of the return pole 43 toward the main pole 42. Despite the use of the term "shield" the trailing shield 44 is also part of the return pole piece. The read shields (S1, S2) which flank the read sensor 35 are not shown, so that the electrical wiring connections can be clearly illustrated. This design has a single coil 33. The portion of the yoke shown comprises ferromagnetic pole pieces 41, 42, 43 and 44. Pole piece 41 provides the volume of ferromagnetic material for the main pole 42, but does not extend to the ABS. Only the tip area of the main pole 42 appears at the ABS. The back of the yoke (not shown) directly connects the pole pieces 41 and 42 to the return pole piece 43. The trailing shield 44 has a simple rectangular cross-section in this design, but other shapes are possible. Without the trailing shield the write gap in this design is limited by the thickness of coil 33 which passes between the main pole piece 42 and the return pole piece 43. The trailing shield allows the length of write gap to be optimized independent of the coil thickness.

The trailing shield improves the design to achieve a better write field gradient and lower media noise. One of the critical parameters in this design is the trailing shield thickness. The ELG 52 can be used to calculate the thickness of the trailing shield 44 during lapping.

The ELG 52 in the embodiment shown in FIG. 2 is located in the write gap between the main pole piece 42 and the trailing shield 44. The material used for the ELG should preferably be one that will not be damaged during a long wet-etch process for the vias in the head such as electrical connections 54, 56. Rhodium is the preferred material for its ability to survive process conditions. Among the many other materials which could be used are permalloy, whatever material is used for the main pole piece 42 (P2), whatever material is used for read sensor, etc. The ELG should be designed to provide a measurable resistance that will increase as material is lapped away. The volume of material in the ELG will be small, so that even a metal such as rhodium will form a resistive ELG. The ELG material should be vacuum deposited by a thin film method that forms the layer with good uniformity. Atomic layer deposition is preferred. The ELG in this embodiment begins in the region to be removed by lapping (which is the material below the plane labeled ABS in FIG. 2) and extends through the ABS into the write gap of the head. The ELG should extend deep enough into the slider to reliably extend beyond the back of the floating shield 44. Optionally the ELG can extend beyond the trailing shield 44 and along the coil 33 toward the back of the yoke.

The electrical connections for the ELG are shown as heavy dotted lines 54, 56 which in this embodiment connect to the R+ pad and Pad5 which is a $5^{th}$ electrical connection point in addition to the four standard connection pads (W+, W−, R+, R−). Although not shown, W+ and W− are connected to the coil 33. The R+ and R− pads are connected to the read sensor. R+ is shown as the second lead pad connection, but any of the other pads will work as well. The fact that R+ or any one of the other operational pads is connected to the ELG will have no effect on the operation of the head, since the other connection to the ELG is to PAD5.

The ELG can alternatively be connected to the 5$^{th}$ pad and a 6$^{th}$ pad to be completely isolated from the operational read and write connections. The points where the two electrical wires 54, 56 connect to the ELG and the details of the connection to allow the measurement of the resistance are according to the prior art.

During lapping the resistance of the ELG of the first embodiment is monitored by the system along with the resistance of the read sensor or a prior art ELG which acts a surrogate for the read sensor. The initial resistance of the ELG for the write head can be determined empirically, but will be affected by the type of material, the volume of material, the position of the connectors, etc. As material is removed from the ELG during lapping the resistance will increase according to known principles which will allow calculations using the measured resistance to determine where the lapping plane is in relation to the target ABS for the write structures.

Figure 3:
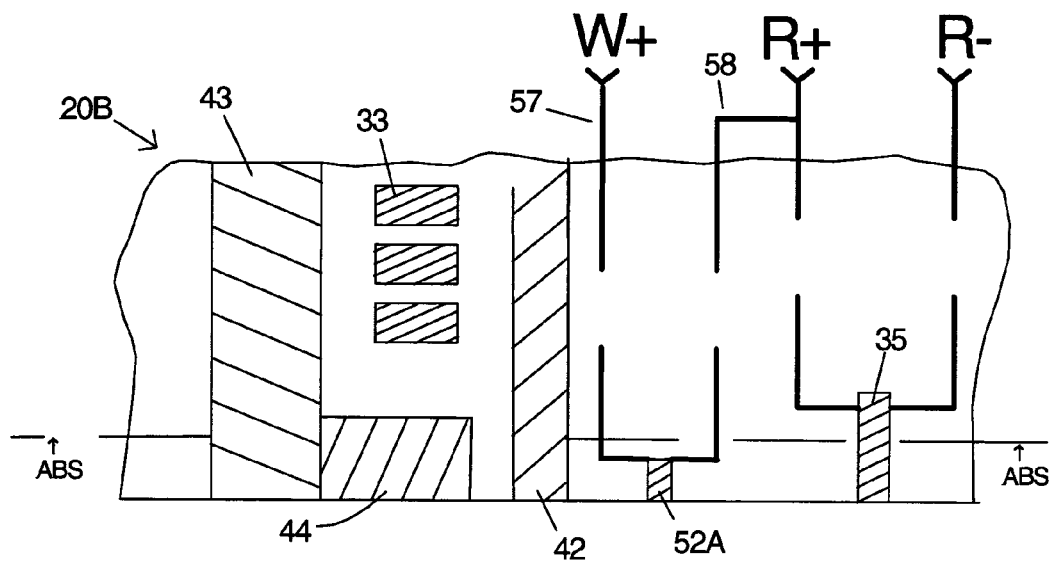
FIG. 3 is a symbolic illustration of a section of a recording head with an integrated ELG according to a second embodiment of the invention. The section taken is perpendicular to the air-bearing surface.

FIG. 3 illustrates a second embodiment of the invention which can be used alone or in combination with first embodiment. In this embodiment the ELG 52A is used only during a first phase of lapping of slider 20B. The ELG 52A begins and ends in the lapping area (prior to the target ABS). It is common to conduct lapping in two phases with a rapid removal phase being used initially followed by a slower, more precise final phase. One use for this ELG is to determine the endpoint of the phase of rapid material removal. The electrical connections can be between either write pad (W+ or W−) and either read pad (R+ or R−). In the embodiment shown in FIG. 3 electrical lead 57 connects the ELG to W+ and electrical lead 58 connects the ELG to R+. The resistance of the ELG will increase as material is removed until all of the resistive material has been removed or the connections have been severed at which point the resistance will be very large (essentially an open switch) since it will be determined by the leakage of insulating material between the electrical leads. From that point forward other means will be used to determine the exact endpoint. In this embodiment the ELG should end close to the ABS, but not so that process variations might allow it to extend beyond the ABS. For example, using current technology ending the ELG from 10 to 100 nm prior to the ABS would be a reasonable choice. One algorithm that can be used to determine the endpoint after the ELG 52A is disconnected, is:

read sensor resistance within certain range.
AND amplitude of the read sensor above certain minimum values. (Note: The amplitude is measured by applying an external magnetic field.)
AND the critical write head structure, as detected by a through-the-ABS ELG, is within certain range.
(Optional) AND the main pole piece write field above a minimum value. (Note: Requires that the write field be measured in the lapping fixture.)

As noted above both embodiments of the ELG can be used in the same fabrication process.

Figure 4:
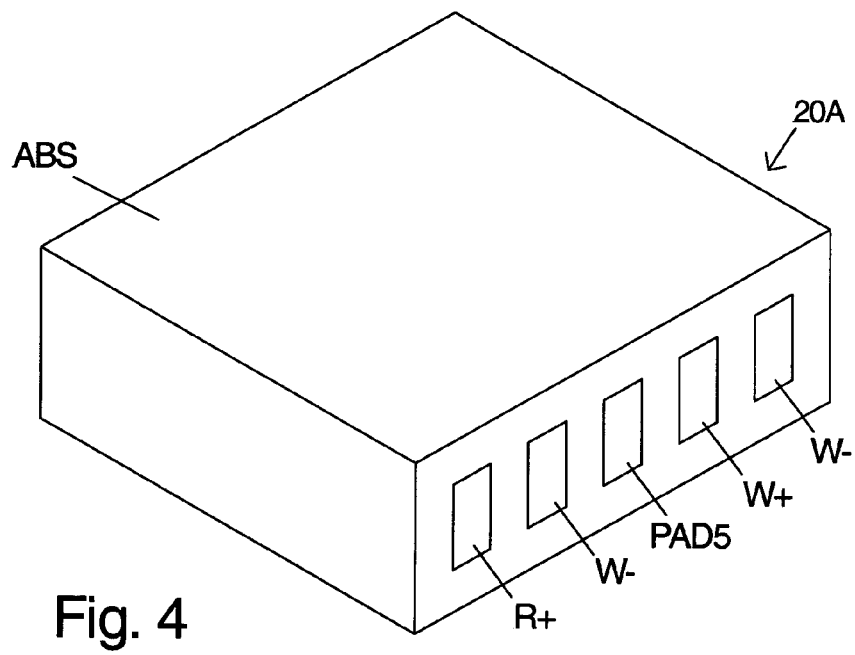
FIG. 4 is a symbolic illustration of a slider with an integrated ELG according to the first embodiment of the invention with an additional lead pad.

FIG. 4 is a symbolic illustration of a slider with an integrated ELG according to the first embodiment of the invention with an additional lead pad (PAD5). The ABS is the top surface in this isometric view. The five lead pads are disposed on a surface that is orthogonal to the ABS which typically will be the rear of the slider when installed in a recording device. An embodiment of a system for lapping a slider 20A with one of more ELGs will have a method of holding the slider firming during lapping such as adhesively binding or clamping the slider to a carrier. The adhesive is applied to the surface parallel to the ABS. The surface with lead pads will be perpendicular to the carrier surface. The lapping fixture must have a way to make an electrical connection to the required lead pads during lapping without interfering with the lapping. The actual electrical connections to the pads can be accomplished by the use of flexible contact connectors, wire bonding, etc.

Figure 5:
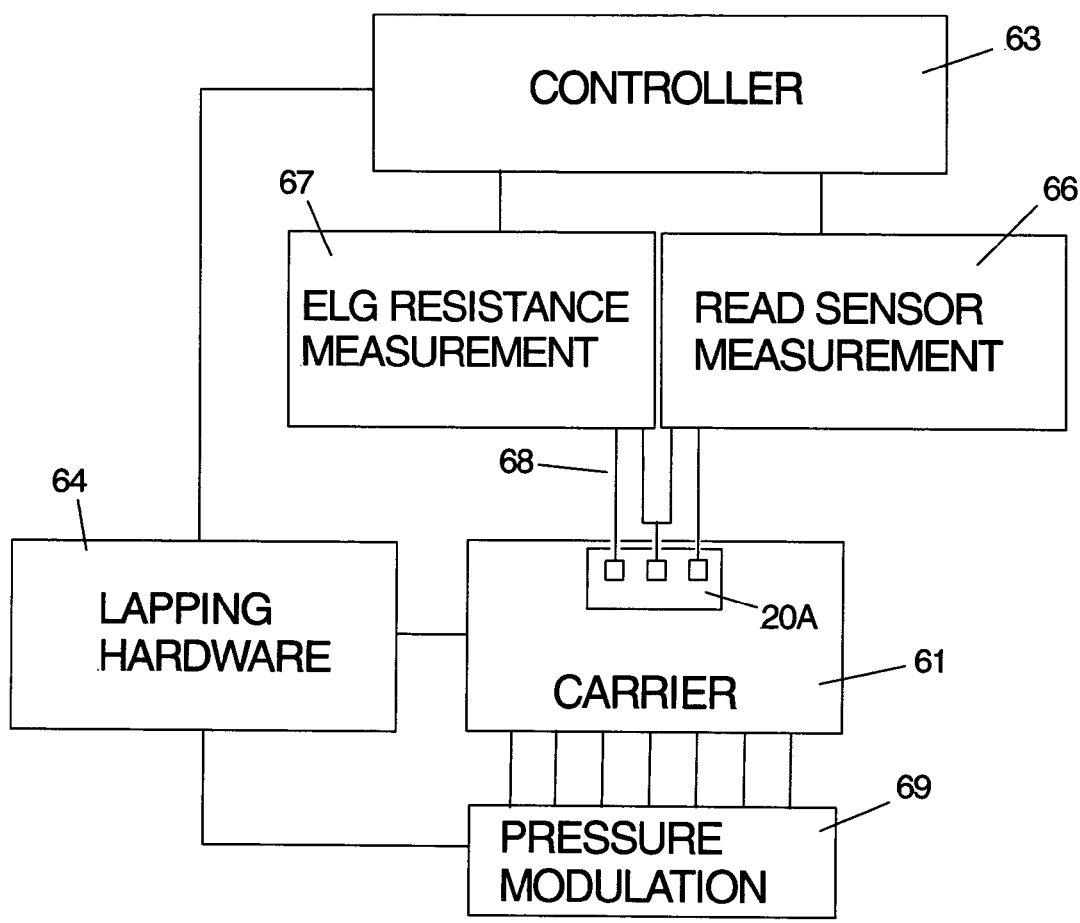
FIG. 5 is a symbolic illustration of a lapping system according to the invention that monitors the read sensor resistance and ELG aligned with a selected structure in the write head.

FIG. 5 is a symbolic illustration of a lapping system according to the invention that monitors the read sensor resistance or a read head ELG and an ELG aligned with a selected structure in the write head as described above. The carrier 61 supports one or more sliders 20A. The lapping hardware 64 acts to mechanically lap the ABS of the sliders. Electrical connections 68 go from the slider pads to two hardware devices: one for ELG resistance measurement 67 and one for read sensor resistance measurement 66. An ELG aligned with the read sensor can be used in place of or in addition to the read sensor. The measurement units 66, 67 will typically include A/D converters and supply digital values to the controller 63 which can be general purpose computer with appropriate software to implement the algorithms described herein and in the prior art to determine when to stop lapping. The controller 63 controls the lapping hardware 64 and optionally implements two phases of lapping by controlling the speed of lapping. If more than one slider is attached to the carrier, additional means must be implemented to modulate the lapping of each slider according to the measurements from that slider. Since the lapping rate is determined in part by the force with which the lapping plate is pressed against the slider, modulating this force is one way to affect the lapping rate. The details of how this could be done are beyond the scope of this application, but, in general, prior art means for varying pressures over small distances could be used such as piezoelectric actuators, voice coils, air pressure based actuators, etc. FIG. 5 shows the optional pressure modulation unit 69 which would have at least one actuator for each slider on the carrier.

The thin film structures described above can be formed using standard thin film fabrication techniques. The material descriptions have been given above without regard for the small amounts of contamination that invariably exist in thin films as is well known to those skilled in the art. The invention has been described with respect to particular embodiments, but other uses and applications for the ELGs according to the invention will be apparent to those skilled in the art.

What is claimed is:

1. A system for fabricating sliders for magnetic recording comprising:
    lapping hardware for lapping an air-bearing surface of a slider;
    means for electrically connecting to lead pads on the slider,
    a first measurement unit, connected to two leads pads that are connected to a read sensor or an electro-lapping guide for the read sensor, which measures a first electrical resistance and generates a first digital signal encoding the first electrical resistance;
    a second measurement unit, connected to two leads pads that are connected to an electro-lapping guide aligned with a selected structure in a write head in the slider, which measures a second electrical resistance and generates a second digital signal encoding the second electrical resistance; and
    a controller that stops the lapping hardware when target conditions for the stripe height are met using the first digital signal as a measure of a current stripe height and target conditions for the selected structure in the write head are met using the second digital signal as a measure of a current lapping plane's proximity to a target air-bearing surface for the write head.

2. The system of claim 1 further comprising pressure modulation means, under control of the controller, that exerts less lapping pressure on the slider when the current lapping plane is closer to target air-bearing surface in comparison to other sliders being lapped.

3. The system of claim 1 wherein the electro-lapping guide aligned with the selected structure in the write head extends from a section of the slider to be removed by lapping into a write gap in the slider.

4. The system of claim 1 wherein the electro-lapping guide aligned with the selected structure in the write head extends from a section of the slider to be removed by lapping into a separation gap in the slider between a pole piece fpr the write head and a shield for the read sensor.

5. The system of claim 1 wherein the electro-lapping guide aligned with the selected structure in the write head is contained in a section of the slider to be removed by lapping.

6. The system of claim 5 wherein the controller performs a rapid first phase of lapping until the electrical resistance measured between the two leads pads that are connected to the electro-lapping guide aligned with the selected structure in the write head becomes that of an open switch and then performs a slow second phase of lapping.

* * * * *